United States Patent
Dassen et al.

(10) Patent No.: US 10,343,316 B2
(45) Date of Patent: Jul. 9, 2019

(54) METHOD AND DEVICE FOR OVERMOLDING A FIBER REINFORCED POLYMERIC COMPONENT

(71) Applicant: SABIC Global Technologies B.V., Bergen op Zoom (NL)

(72) Inventors: Tim Willem Joseph Leonard Dassen, Schinnen (NL); Davy Wilhelmus Anna Brands, Maastricht (NL); Claire Martin, Maaseik (BE); Angel Stoyanov Yanev, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 216 days.

(21) Appl. No.: 15/322,979

(22) PCT Filed: Jul. 1, 2015

(86) PCT No.: PCT/IB2015/054969
§ 371 (c)(1),
(2) Date: Dec. 29, 2016

(87) PCT Pub. No.: WO2016/001860
PCT Pub. Date: Jan. 7, 2016

(65) Prior Publication Data
US 2017/0129148 A1     May 11, 2017

Related U.S. Application Data (60) Provisional application No. 62/019,531, filed on Jul. 1, 2014.

(51) Int. Cl.
*B29C 43/18*     (2006.01)
*B29C 45/14*     (2006.01)
(Continued)

(52) U.S. Cl.
CPC .... *B29C 45/14836* (2013.01); *B29C 45/0001* (2013.01); *B29C 45/0005* (2013.01);
(Continued)

(58) Field of Classification Search
CPC .......... B29C 45/0005; B29C 45/14836; B29C 45/0001; B29C 43/18; B29C 45/14598;
(Continued)

(56) References Cited

U.S. PATENT DOCUMENTS

| | | | | |
|---|---|---|---|---|
| 4,743,481 A * | 5/1988 | Quinlan | ................ | B29C 33/123 264/221 |
| 6,537,484 B2 * | 3/2003 | Nakagawa | .......... | B29C 33/0044 264/250 |

(Continued)

FOREIGN PATENT DOCUMENTS

| | | | |
|---|---|---|---|
| EP | 0492129 A1 | 7/1992 | |
| EP | 1238773 B1 | 11/2005 | |

(Continued)

OTHER PUBLICATIONS

International Search Report for International Application No. PCT/IB2015/054969; International Filing Date: Jul. 1, 2015; dated Oct. 19, 2015; 6 Pages.

(Continued)

*Primary Examiner* — Pinel E Romain
(74) *Attorney, Agent, or Firm* — Cantor Colburn LLP (57) ABSTRACT

A method for manufacturing a hollow overmolded polymeric article comprising: positioning a hollow polymeric structure (10) in a mold (100); supporting the interior surface of the hollow polymeric structure; disposing a fibrous polymeric material (12) into the mold proximal to the outer surface of the hollow polymeric structure; overmolding the fibrous polymeric material onto to the outer surface of the hollow polymeric structure; opening the mold;

(Continued)

and removing a hollow overmolded polymeric article comprising the fibrous polymeric material overmolded on the hollow polymeric structure.

20 Claims, 3 Drawing Sheets

(51) Int. Cl.
    *B29C 45/00*     (2006.01)
    *B62D 29/04*     (2006.01)
    *B29L 23/00*     (2006.01)
    *B29K 105/12*     (2006.01)
    *B29K 701/00*     (2006.01)
    *B29K 105/20*     (2006.01)
    *B29L 31/30*     (2006.01)

(52) U.S. Cl.
    CPC ............ *B62D 29/043* (2013.01); *B29C 43/18* (2013.01); *B29C 45/14598* (2013.01); *B29K 2105/12* (2013.01); *B29K 2105/20* (2013.01); *B29K 2701/00* (2013.01); *B29L 2023/00* (2013.01); *B29L 2031/30* (2013.01)

(58) Field of Classification Search
    CPC ............... B62D 29/043; B29L 2031/30; B29L 2023/00; B29K 2105/20; B29K 2105/12; B29K 2701/00
    USPC ...................................................... 296/187.5
    See application file for complete search history.

(56) References Cited

U.S. PATENT DOCUMENTS

| | | | | |
|---|---|---|---|---|
| 8,449,018 | B2* | 5/2013 | Grgac ................. | B29C 45/0005 296/1.08 |
| 9,487,227 | B2* | 11/2016 | Heitz ..................... | B29C 70/52 |
| 2007/0077379 | A1* | 4/2007 | Passera ............... | B29C 45/1706 428/35.7 |
| 2008/0241576 | A1* | 10/2008 | Le Gall ..................... | B32B 5/18 428/621 |
| 2015/0284035 | A1* | 10/2015 | Reese .................. | B62D 29/043 296/193.02 |

FOREIGN PATENT DOCUMENTS

| | | |
|---|---|---|
| GB | 2267678 A | 12/1993 |
| JP | 62070017 A | 3/1987 |
| JP | 06122158 A | 5/1994 |
| JP | 06210643 A | 8/1994 |
| JP | 2002144487 A | 5/2002 |

OTHER PUBLICATIONS

Written Opinion of the International Searching Authority for International Application No. PCT/IB2015/054969; International Filing Date: Jul. 1, 2015; dated Oct. 19, 2015; 5 Pages.

Schut, "Molding Paper like Plastic," Plastics Engineering Blog: The Monthly Blog for Plastics Engineering Magazine; Posted Jan. 13, 2015; Accessed Dec. 29, 2016; 25 Pages.

* cited by examiner

METHOD AND DEVICE FOR OVERMOLDING A FIBER REINFORCED POLYMERIC COMPONENT

CROSS REFERENCE TO RELATED APPLICATIONS

This application is a 371 of International Application No. PCT/IB2015/054969, filed Jul. 1, 2015, which claims priority to U.S. Patent Application No. 62/019,531, filed Jul. 1, 2014 both of which are incorporated by reference in their entirety herein.

BACKGROUND

This disclosure relates to a fiber reinforced polymeric material overmolded onto a polymeric insert to form a closed section geometry for use as a structural reinforcement component, and methods of making the same. In particular, disclosed herein is a closed section reinforcement structure for use in a structural component of a vehicle such as a lift gate and methods of making the same.

Structural components for vehicles, such as front end modules and lift gates, can be loaded with torsion due to forces acting at separate locations. To accommodate this requirement, having high bending stiffness in such structural components is desirable. A lift gate is a large component member of a vehicle body, and rotates significantly around a hinge when it opens or closes. Lift gates are provided to open or close an opening portion formed at a rear portion of a hatch back type of passenger vehicle or the like. Due to the level of stress from the repeated opening and closing of the lift gate and the size of the lift gate, ribs or steel inserts can be employed to ensure proper operation and structural stability. Other attempts to increase the stiffness and torsional rigidity include increasing the thickness of the panels. However, an increase of the panel thickness and/or the addition of the ribs for increasing the rigidity of the lift gate also increases the overall weight of the lift gate, which can negatively affect the fuel efficiency of the vehicle. Furthermore, the use of reinforcements, such as ribs, can affect the ability to efficiently run wires, cables, or the like through the lift gate. In addition, ribs and other reinforcements negatively impact the aesthetic quality of the lift gate because such features can leave visible imperfections on the panels, thus requiring an additional panel to be installed to provide a finished appearance. The use of steel or other materials in combination with a plastic lift gate can also add manufacturing time and expense to the production of a lift gate or vehicle component.

Because the weight of a vehicle body has an impact on the fuel consumption of the vehicle, attempts have been made to produce a lift gate from lighter-weight materials, such as polymeric materials, in an effort to reduce the overall weight of the vehicle. The use of polymeric materials reduces the overall weight, but in some applications may not accommodate stresses and strains placed on the lift gate. As an example, the lift gate may bend undesirably. This can displease a consumer. Worse yet, such flexure may fail to sufficiently resist deformation in a crash.

For some applications, techniques such as injection molding and/or injection compression molding, such as with a given drawn direction and sliders, cannot provide desired and/or sufficient torsion stiffness for a structural component. Other techniques, such as gas injection molding and water injection molding, do not provide the requisite control over wall thicknesses. In addition, the use collapsible cores and sliders can include parts that shift during a molding process resulting in deviations in the intended wall thickness. Thus, attempts have been made using metal inserts to provide a surface for molding a polymeric structural component. However, metal inserts add weight and negatively impact the fuel economy of a vehicle. Moreover, past attempts to manufacture fiber reinforced components exhibit numerous manufacturing defects including varying wall thickness and difficulty in reproducing wall thicknesses. For example, long glass fiber reinforced plastics can suffer from "fiber foaming" at the inside of the component (e.g., where the fiber reinforced plastic contacts a load bearing slider, core, or metallic insert).

Accordingly, a need exists for light-weight polymeric components including fiber reinforced polymers with controllable, reproducible wall thicknesses.

SUMMARY

Disclosed herein are closed section geometry reinforcement components made from a fiber reinforced polymeric material overmolded on a polymeric insert and methods of making the same.

A method for manufacturing a hollow overmolded polymeric article comprising: positioning a hollow polymeric structure in a mold; supporting the interior surface of the hollow polymeric structure; disposing a fibrous polymeric material into the mold proximal to the outer surface of the hollow polymeric structure; overmolding the fibrous polymeric material onto to the outer surface of the hollow polymeric structure; opening the mold; and removing a hollow overmolded polymeric article comprising the fibrous polymeric material overmolded on the hollow polymeric structure.

A method for producing an overmolded polymeric article comprising: positioning a prefabricated hollow polymeric component in a mold; wherein the hollow polymeric component is open at two end portions; plugging the two end portions, wherein one plug is coupled to a pressurization device; applying an internal pressure to the hollow polymeric component; and overmolding the hollow polymeric component with a fibrous polymer.

A hollow overmolded polymeric article comprising: a fibrous polymer overmolded onto a hollow polymeric structure; wherein the hollow polymeric structure comprises a wall thickness of less than or equal to 0.5 mm.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Disclosed herein are structural reinforcement components and methods of producing structural reinforcement components including a polymeric insert overmolded with a fiber reinforced material resulting in increased bending and torsional stiffness and consistent, reproducible wall thicknesses. It is believed that the favorable results obtained herein, e.g., low mass, high strength polymeric components can be achieved through the use of a polymeric insert having a thin hollow profile overmolded with a fiber reinforced material to form a closed section geometry.

A hollow overmolded polymeric article can include a fibrous polymer overmolded onto a hollow polymeric structure or insert. For example, the hollow polymeric structure or insert can have a closed section geometry. Thus, when overmolded with a fibrous polymeric material, the resulting article can have a closed section geometry. The hollow polymeric structure can be prefabricated and placed in a mold prior to the overmolding with the fibrous polymeric material. The hollow polymeric structure can include any closed section geometry. For example, the hollow polymeric can have a cross sectional shape of a polygon, circle, ellipse, and combinations including at least one of the foregoing. The hollow polymeric structure can have a thickness of less than or equal to 0.5 millimeters (mm).

The fiber reinforced material (also referred to as the fibrous material) overmolded onto the hollow polymeric structure can form the outer portion of the molded article and can take any shape and is not limited to the exact cross-sectional shape of the hollow polymeric structure. For example, the hollow structure can have a square cross section, and the fiber reinforced material can be overmolded with a rectangular cross section or a round cross section. The fiber reinforced portion of the article can have a thickness that is greater than the thickness of the hollow polymeric structure. For example, the fiber reinforced portion can have a thickness that is greater than or equal to 150% of the thickness of the hollow polymeric structure. The fiber reinforced portion can have a thickness that is greater than or equal to 200% of the thickness of the hollow polymeric structure. The thickness of the fibrous material overmolded onto the hollow polymeric structure can vary by less than or equal to 2% at any point on the article when the cross-sectional shape is identical to the hollow polymeric structure. However, when the cross-sectional shape of the overmolded fibrous material is not the same as the hollow polymeric structure (e.g., rectangular overmolded cross section on a hollow polymeric structure having a square cross section), the thickness of the fibrous material can vary. Thus, a consistent thickness can be achieved.

A method for manufacturing a hollow overmolded polymeric article can include positioning a hollow polymeric structure in a mold. The hollow portion of the hollow polymeric structure can be pressurized. For example, the ends of the hollow polymeric structure can be plugged and a pressurized fluid or gas source can be coupled to one of the plugs. A pressurized fluid or gas can be introduced into the hollow space. The pressurized fluid or gas can exert a pressure on the inner surface of the hollow polymeric structure greater than or equal to that of the molding apparatus. The pressurized fluid or gas can be at a lower temperature than the mold surfaces and/or polymeric structure. Such molding apparatus having a pressurized fluid (e.g., water or gas) source can include any suitable molding apparatus capable of being coupled to a pressurization device In the alternative, one or more inserts can be introduced into the hollow space within the hollow polymeric structure. The inserts can be sliders configured to be removed after completion of the molding process. The insert can be a single piece of material configured to be removed upon completion of the molding process. The insert can be metallic, ceramic, or any material suitable to withstand the molding pressure. The insert can contact the interior of the hollow polymeric structure. The insert can include portions that do not contact the interior of the hollow polymeric structure. In other words, the insert can include an outer surface that does not match the interior surface of the hollow polymeric structure.

A fibrous polymeric material can be disposed into the mold proximal to the outer surface of the hollow polymeric structure. For example, the fibrous polymeric material can be introduced through injection molding.

The mold can be closed to overmold the fibrous polymeric material onto to the outer surface of the hollow polymeric structure. The mold can be opened and a hollow overmolded polymeric article comprising the fibrous polymeric material overmolded on the hollow polymeric structure can be removed.

The overmolded polymeric articles can be used in vehicle components. The term "vehicle component" as used herein can refer to a lift gate, door module, front end module, and other components such as, but not limited to instrument panel carriers, bumper claddings of a vehicle structure. For example, the overmolded polymeric articles can be used as a reinforcement component for a lift gate.

Examples of polymeric materials for use in the thin hollow structure include thermoplastic materials as well as combinations of thermoplastic materials with elastomeric materials and/or thermoset materials. Possible thermoplastic materials include polybutylene terephthalate (PBT); acrylonitrile-butadiene-styrene (ABS); polycarbonate (LEXAN™ and LEXAN™ EXL resins, commercially available from SABIC Innovative Plastics); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC Innovative Plastics); blends of polycarbonate/polyethylene terephthalate (PET)/PBT; polybutylene terephthalate and impact modifier (XENOY™ resins, commercially available from SABIC Innovative Plastics); polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO), as well as combinations comprising at least one of the foregoing. The fibrous polymeric material for overmolding the hollow polymeric structure can include any of the foregoing polymer materials that can be used in a reinforced composite polymer material with the incorporation of reinforcing material. As used herein, a reinforced composite polymer can include a polymer and reinforcing material, such as fibers, (continuous, chopped, woven, and the like) formed of aramid, carbon, basalt, glass, plastic, metal (e.g. steel, aluminum, magnesium), quartz, boron, cellulose, liquid crystal polymer, high tenacity polymer (e.g., polypropylene, polyethylene, poly(hexano-6-lactam), poly[imino(1,6-dioxohexamethylene) imnohexamethylene]), thermoplastic polymer fibers, thermoset polymer fibers, or natural fibers, as well as combinations comprising at least one of the foregoing. A high tenacity polymer can be poly[imino(1,6-dioxohexamethylene) imnohexamethylene]. An exemplary fiber filled resin is STAMAX™ resin, which is a long glass fiber filled polypropylene resin also commercially available from SABIC Innovative Plastics. Another exemplary fibrous material can include long fiber reinforced thermoplastics (VERTON™ resins, commercially available from SABIC Innovative Plastics).

The fibrous polymeric material can include 10 to 90 wt. % fibers and 90 to 10 wt. % polymeric material. The fibrous polymeric material can include 25 to 75 wt. % fibers and 75 to 25 wt. % polymeric material. The fibers used for can include long fibers, e.g., fibers having an aspect ratio (length/diameter) of greater than or equal to 10. The fibers can include an aspect ratio greater than or equal to 50. The fibers can include an aspect ratio from 50 to 500. The fibers can include an aspect ratio of 80 to 400. For example, the diameter of the long fiber may range from 5 to 35 micrometers (μm). The diameter of the long fiber can be 10 to 20 μm. The fibers can have a length, for example, of greater than or equal to 0.4 mm, e.g., 0.4 mm to 30 mm or longer. The fibers can include a length of greater than or equal to 1 mm. The fibers can include a length of greater than or equal to 2 mm.

The fibrous polymeric material can be is less than or equal to 1.5 g/cm$^3$. The material of the hollow polymeric structure can have a density of less than or equal to 1.5 g/cm$^3$.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
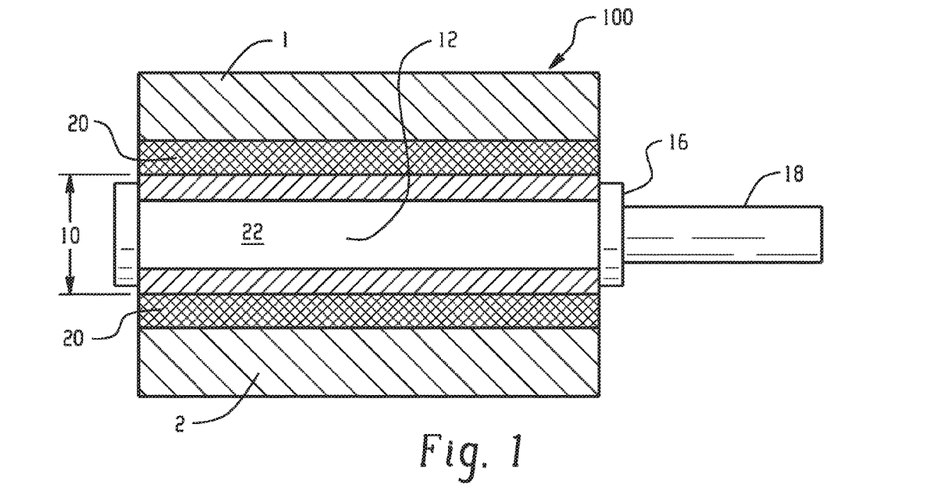
FIG. 1 is a cross sectional side view of a molding apparatus equipped with a pressurizing device to support a hollow polymeric structure.

FIG. 1 illustrates a molding apparatus 100 including upper mold portion 1 and lower mold portion 2. Hollow polymeric structure (component) 10 is placed in molding apparatus 100. The ends of the hollow polymeric structure 10 can be plugged with one or more plugs 16. Pressurization device 18 can be coupled to plug 16 and provide an internal pressure to the hollow space 12 within hollow polymeric structure 10. For example, pressurization device 18 can deliver a pressurized fluid (e.g., water or gas) 22 to the hollow space 12 at a pressure equal to or greater than the pressure supplied by upper mold 1 and lower mold 2. A fibrous material 20 can be disposed proximal to outer surface of hollow polymeric structure 10 and overmolded onto hollow polymeric structure 10. For example, fibrous material 20 can be injected into the mold apparatus. Upon opening of the molding apparatus, pressurization device 18 and plug 16 can be removed from the ends of hollow polymeric structure 10 and an overmolded polymeric article can be removed from the molding apparatus 100.

Figure 2:
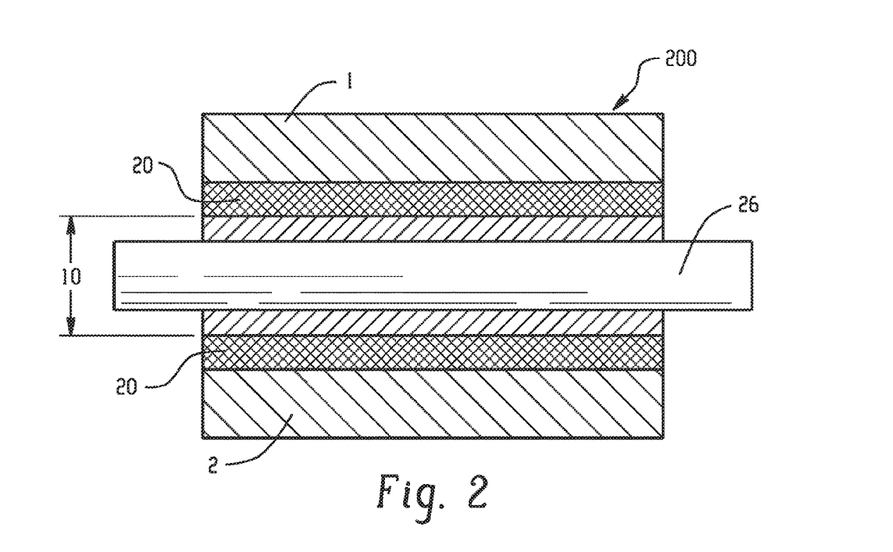
FIG. 2 is a cross sectional side view of a molding apparatus equipped with an insert to support a hollow polymeric structure.

As shown in FIG. 2, a metal insert 26 can be inserted into the hollow space 12 of hollow polymeric structure 10. The metal insert 26 has sufficient strength to withstand the pressure from upper mold 1 and lower mold 2 during the molding process without deformation. Thus, metal insert 26 provides an internal support to hollow polymeric structure 10 that is stronger than or equal to the molding pressure. Fibrous material 20 can be disposed proximal to hollow polymeric structure 10 and overmolded onto hollow polymeric structure 10. Upon opening of the mold apparatus 200, metal insert 26 can be removed from hollow space 12 and an overmolded polymeric article can be removed from the molding apparatus 200.

Figure 3:
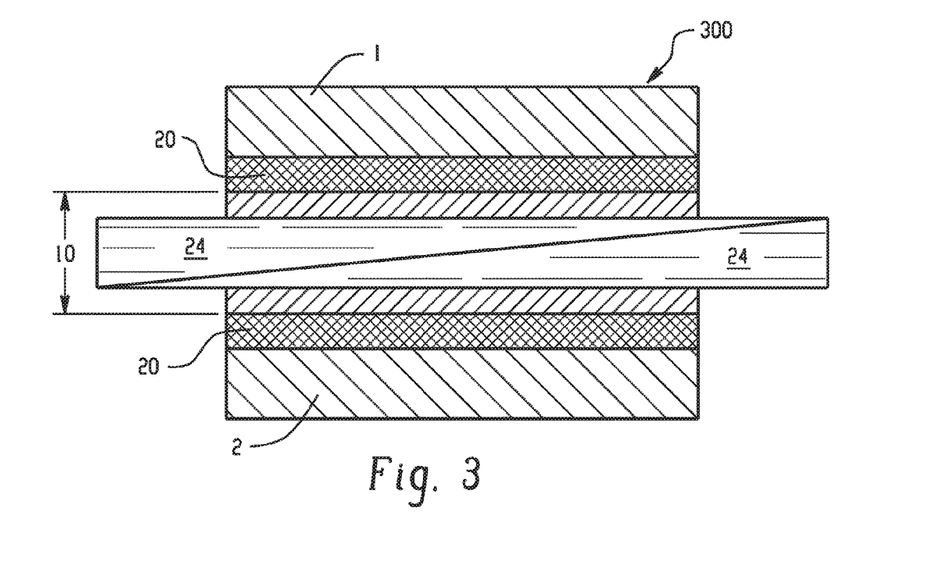
FIG. 3 is a cross sectional side view of a molding apparatus equipped with sliders to support a hollow polymeric structure.

As shown in FIG. 3, sliders 24 can be inserted into the hollow space 12 of hollow polymeric structure 10. Sliders 24 can be of sufficient strength to withstand the pressure from upper mold 1 and lower mold 2 during the molding process without deformation. Thus, sliders 24 can provide an internal support to hollow polymeric structure 10 that is stronger than or equal to the molding pressure. Fibrous material 20 can be disposed proximal to hollow polymeric structure 10 and overmolded onto hollow polymeric structure 10. Upon opening of the mold apparatus, sliders 24 can be removed from hollow space 12 and an overmolded polymeric article can be removed from the molding apparatus 300.

Figure 4:
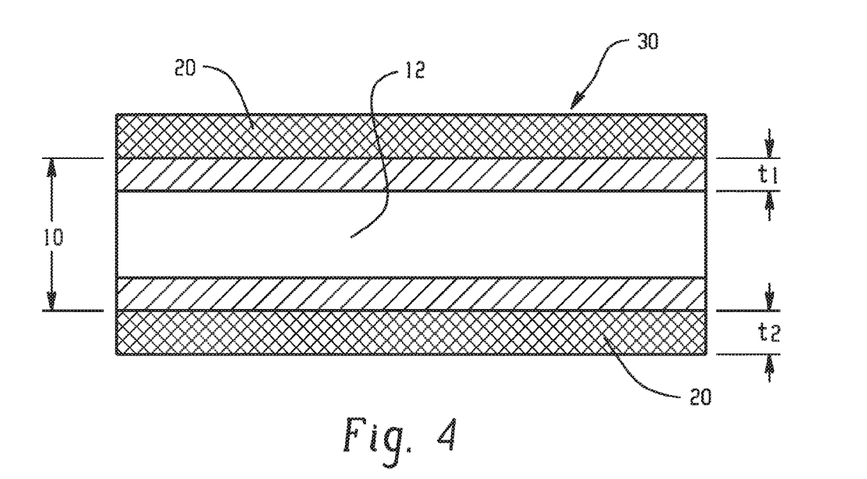
FIG. 4 is a cross sectional view of a hollow overmolded polymeric article.

FIG. 4 illustrates a cross-sectional front view of hollow overmolded polymeric article 30 which can be made by any of the apparatus shown in FIG. 1, 2, or 3. As shown in FIG. 4, hollow polymeric article 30 includes a layer of fibrous material 20 overmolded onto a hollow polymeric structure 10. Hollow space 12 is located within and defined by hollow polymeric structure 10. The overmolded fibrous material 20 can include a thickness t2 of 0.5 mm to 20 mm. In addition, hollow polymeric structure 10 can include a wall thickness t1 of less than or equal to 0.5 mm. The thickness t2 of the fibrous material 20 overmolded onto the hollow polymeric structure can vary by less than or equal to 2% at any point on the article. Thus, a consistent thickness can be achieved.

Figure 5:
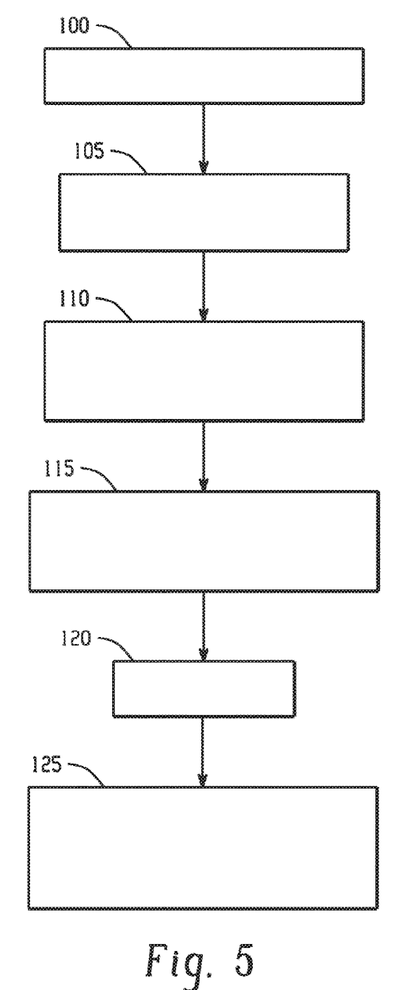
FIG. 5 is a flow diagram of a process for making a hollow overmolded polymeric article.

FIG. 5 illustrates a method of manufacturing a hollow overmolded polymeric article. In step 100, hollow polymeric structure 10 is positioned in a molding apparatus (e.g., in the mold). The hollow space 12 of hollow polymeric structure 10 is pressurized in step 105. Fibrous polymeric material is disposed proximal the hollow polymeric structure 10 in step 115. The mold is opened in step 120. A hollow polymeric article 30 including the fibrous polymeric material 20 overmolded onto the hollow polymeric structure 110 (e.g., onto the outer surface of the hollow polymeric structure 110) is removed from the mold in step 125.

Figure 6:
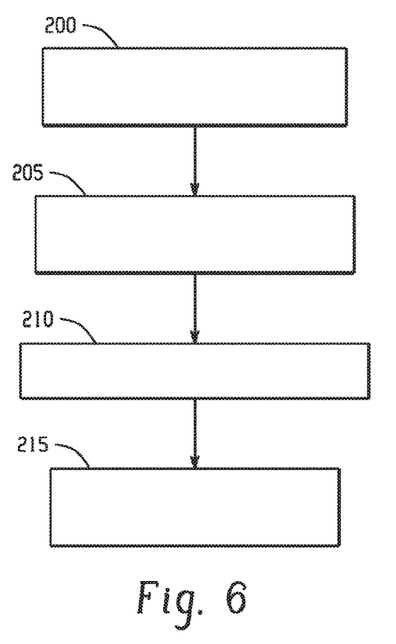
FIG. 6 is a flow diagram of a process for making a hollow overmolded polymeric article.

FIG. 6 illustrates a method for producing an overmolded polymeric article. In step 200, prefabricated hollow polymeric component 10 is positioned in a molding apparatus. The end portions of hollow space 12 are plugged in step 205 and an internal pressure is applied to hollow polymeric component 10 in step 210. Fibrous polymeric material is overmolded onto the hollow polymeric component 10 in step 215.

Set forth below are some embodiments of connectors and methods of making connectors as disclosed herein.

Embodiment 1

A method for manufacturing a hollow overmolded polymeric article comprising: positioning a hollow polymeric structure in a mold; supporting the interior surface of the hollow polymeric structure; disposing a fibrous polymeric material into the mold proximal to the outer surface of the hollow polymeric structure; overmolding (e.g., closing the mold to overmold) the fibrous polymeric material onto the outer surface of the hollow polymeric structure (e.g., in a mold); opening the mold; and removing a hollow overmolded polymeric article comprising the fibrous polymeric material overmolded on the hollow polymeric structure.

Embodiment 2

The method of Embodiment 1, wherein introducing a fibrous polymeric material comprises injecting the fibrous polymeric material into the mold.

Embodiment 3

The method of Embodiments 1 or 2, wherein the hollow polymeric structure comprises a wall thickness of less than or equal to 0.5 mm.

Embodiment 4

The method of any of Embodiments 1-3, wherein the fibrous polymeric material comprises polybutylene terephthalate; acrylonitrile-butadiene-styrene; polycarbonate; polycarbonate/polybutylene terephthalate blends; polycarbonate/acrylonitrile-butadiene-styrene blends; copolycarbonate-polyesters; acrylic-styrene-acrylonitrile; acrylonitrile-(ethylene-polypropylene diamine modified)-styrene; phenylene ether resins; blends of polyphenylene ether/polyamide blends of polycarbonate/polyethylene terephthalate/polybutylene terephthalate; polybutylene terephthalate and impact; polyamides; phenylene sulfide resins; polyvinyl chloride; high impact polystyrene; low/high density polyethylene; polypropylene; expanded polypropylene; and thermoplastic olefins, and combinations comprising at least one of the foregoing.

Embodiment 5

The method of any of Embodiments 1-4, wherein the fibrous polymeric material comprises fibers comprising aramid, carbon, basalt, glass, plastic, metal, quartz, boron, cellulose, liquid crystal polymer, thermoplastic polymer, thermoset polymer, natural fibers, and combinations comprising at least one of the foregoing; preferably high tenacity polymer; and more preferably polypropylene, polyethylene, poly(hexano-6-lactam), poly[imino(1,6-dioxohexamethylene) imnohexamethylene], and combinations comprising at least one of the foregoing; preferably poly[imino(1,6-dioxohexamethylene) imnohexamethylene].

Embodiment 6

The method of any of Embodiments 1-5, wherein the fibrous polymeric material comprises long glass fiber filled polypropylene.

Embodiment 7

The method of any of Embodiments 1-6, wherein supporting the interior surface of hollow polymeric structure comprises plugging the ends of the hollow polymeric structure and applying pressurized fluid to the hollow space within the hollow polymeric structure, preferably, wherein the fluid is gas, and more preferably wherein the fluid is water.

Embodiment 8

The method of any of Embodiments 1-6, wherein supporting the interior surface of hollow polymeric structure comprises plugging the ends of the hollow polymeric structure and applying pressurized gas to hollow space within the hollow polymeric structure.

Embodiment 9

The method of any of Embodiments 1-6, wherein supporting the interior surface of hollow polymeric structure comprises inserting a slider into each end of the hollow polymeric structure, optionally wherein the slider contacts the inner surface of the hollow polymeric structure; and optionally wherein the sliders has sufficient structural integrity (e.g., strength) to withstand molding pressures without deformation.

Embodiment 10

The method of any of Embodiments 1-6, wherein supporting the interior surface of hollow polymeric structure comprises inserting a metal insert into the hollow polymeric structure, optionally wherein the metal insert contacts the inner surface of the hollow polymeric structure, and optionally wherein the metal insert has sufficient structural integrity (e.g., strength) to withstand molding pressures without deformation.

Embodiment 11

The method of any of Embodiments 1-10, wherein the cross section of the hollow polymeric structure comprises a closed section geometry.

Embodiment 12

The method of any of Embodiments 1-11, wherein the wall thickness of the fiber fibrous polymer forms a wall that varies by less than 2% in thickness at any point in the overmolded article.

Embodiment 13

The method of any of Embodiments 1-12, wherein the wall thickness of the fiber reinforced polymeric material is at least 150% of the wall thickness of the hollow polymeric structure.

Embodiment 14

The method of any of Embodiments 1-13, wherein the hollow polymeric structure comprises polybutylene terephthalate; acrylonitrile-butadiene-styrene; polycarbonate; polycarbonate/polybutylene terephthalate blends; polycarbonate/acrylonitrile-butadiene-styrene blends; copolycarbonate-polyesters; acrylic-styrene-acrylonitrile; acrylonitrile-(ethylene-polypropylene diamine modified)-styrene; phenylene ether resins; blends of polyphenylene ether/polyamide blends of polycarbonate/polyethylene terephthalate/polybutylene terephthalate; polybutylene terephthalate and impact; polyamides; phenylene sulfide resins; polyvinyl chloride; high impact polystyrene; low/high density polyethylene; polypropylene; expanded polypropylene; and thermoplastic olefins, and combinations comprising at least one of the foregoing.

Embodiment 15

A method for producing an overmolded polymeric article comprising: positioning a prefabricated hollow polymeric component in a mold; wherein the hollow polymeric component is open at two end portions; plugging the two end portions, wherein one plug is coupled to a pressurization device; applying an internal pressure to the hollow polymeric component; and overmolding the hollow polymeric component with a fibrous polymeric material.

Embodiment 16

The method of Embodiment 15, wherein the pressurization device comprises a gas pressurization device.

Embodiment 17

The method of Embodiment 15, wherein the pressurization device comprises a liquid pressurization device.

Embodiment 18

The method of Embodiment 17, wherein the liquid comprises water, preferably cooled water.

Embodiment 19

The method of any of Embodiments 15-18, wherein the fibrous polymeric material comprises polybutylene terephthalate; acrylonitrile-butadiene-styrene; polycarbonate; polycarbonate/polybutylene terephthalate blends; polycarbonate/acrylonitrile-butadiene-styrene blends; copolycarbonate-polyesters; acrylic-styrene-acrylonitrile; acrylonitrile-(ethylene-polypropylene diamine modified)-styrene; phenylene ether resins; blends of polyphenylene ether/polyamide blends of polycarbonate/polyethylene terephthalate/polybutylene terephthalate; polybutylene terephthalate and impact; polyamides; phenylene sulfide resins; polyvinyl chloride; high impact polystyrene; low/high density polyethylene; polypropylene; expanded polypropylene; and thermoplastic olefins, and combinations comprising at least one of the foregoing.

Embodiment 20

The method of any of Embodiments 15-19, wherein the fibrous polymeric material comprises fibers comprising aramid, carbon, basalt, glass, plastic, metal, quartz, boron, cellulose, liquid crystal polymer, thermoplastic polymer, thermoset polymer, natural fibers, and combinations comprising at least one of the foregoing; preferably high tenacity polymer; and more preferably polypropylene, polyethylene, poly(hexano-6-lactam), poly[imino(1,6-dioxohexamethylene) imnohexamethylene], and combinations comprising at least one of the foregoing; and more preferably poly[imino (1,6-dioxohexamethylene) imnohexamethylene].

Embodiment 21

The method of any of Embodiments 15-20, wherein the prefabricated hollow polymeric component comprises a wall thickness of less than or equal to 0.5 mm.

Embodiment 22

The method of any of Embodiments 15-21, wherein the cross section of the hollow polymeric component comprises a closed section geometry.

Embodiment 23

The method of any of Embodiments 15-22, wherein the fibrous polymer forms a wall thickness that varies by less than 2% in thickness at any point in the overmolded article.

Embodiment 24

The method of any of Embodiments 1-23, wherein the hollow polymeric structure comprises polycarbonate.

Embodiment 25

The method of any of Embodiments 1-24, wherein the density of the fibrous polymer and the material of the hollow polymeric structure is less than or equal to 1.5 g/cm$^3$.

Embodiment 26

A vehicle component produced by the method of any of Embodiments 1-25.

Embodiment 27 vehicle comprising: a structural body; and the vehicle component of Embodiment 26.

Embodiment 28

A hollow overmolded polymeric article (preferably the article of any of Claims 1-25) comprising: a fibrous polymer overmolded onto a hollow polymeric structure; wherein the hollow polymeric structure comprises a wall thickness of less than or equal to 0.5 mm.

Embodiment 29

The article of Embodiment 28, wherein the fibrous polymeric material comprises polybutylene terephthalate; acrylonitrile-butadiene-styrene; polycarbonate; polycarbonate/polybutylene terephthalate blends; polycarbonate/acrylonitrile-butadiene-styrene blends; copolycarbonate-polyesters; acrylic-styrene-acrylonitrile; acrylonitrile-(ethylene-polypropylene diamine modified)-styrene; phenylene ether resins; blends of polyphenylene ether/polyamide blends of polycarbonate/polyethylene terephthalate/polybutylene terephthalate; polybutylene terephthalate and impact; polyamides; phenylene sulfide resins; polyvinyl chloride; high impact polystyrene; low/high density polyethylene; polypropylene; expanded polypropylene; and thermoplastic olefins, and combinations comprising at least one of the foregoing.

Embodiment 30

The article of any of Embodiments 28-29, wherein the fibrous polymeric material comprises fibers comprising of aramid, carbon, basalt, glass, plastic, metal, quartz, boron, cellulose, liquid crystal polymer, thermoplastic polymer, thermoset polymer, natural fibers, and combinations comprising at least one of the foregoing; preferably high tenacity polymer; and more preferably polypropylene, polyethylene, poly(hexano-6-lactam), poly[imino(1,6-dioxohexamethylene) imnohexamethylene], and combinations comprising at least one of the foregoing, and more preferably poly[imino (1,6-dioxohexamethylene) imnohexamethylene].

Embodiment 31

The article of any of Embodiments 28-30, wherein the fibrous polymeric material comprises long glass fiber filled polypropylene.

Embodiment 32

The article of any of Embodiments 28-31, wherein the cross section of the hollow polymeric structure comprises a closed section geometry.

Embodiment 33

The article of Embodiment 32, wherein the cross section of the hollow polymeric structure comprises a circle, ellipse, polygon, and combinations thereof.

Embodiment 34

The article of any of Embodiments 28-33, wherein the cross section of the outer perimeter of the overmolded polymeric structure is different than the cross section of the outer perimeter of the hollow polymeric structure.

Embodiment 35

The article of any of Embodiments 28-34, wherein the density of the fibrous polymer and the material of the hollow polymeric structure is less than or equal to 1.5 g/cm$^3$.

Embodiment 36

The article of any of Embodiments 28-35, wherein the hollow polymeric structure comprises polybutylene terephthalate; acrylonitrile-butadiene-styrene; polycarbonate; polycarbonate/polybutylene terephthalate blends; polycarbonate/acrylonitrile-butadiene-styrene blends; copolycarbonate-polyesters; acrylic-styrene-acrylonitrile; acrylonitrile-(ethylene-polypropylene diamine modified)-styrene; phenylene ether resins; blends of polyphenylene ether/polyamide blends of polycarbonate/polyethylene terephthalate/polybutylene terephthalate; polybutylene terephthalate and impact; polyamides; phenylene sulfide resins; polyvinyl chloride; high impact polystyrene; low/high density polyethylene; polypropylene; expanded polypropylene; and thermoplastic olefins, and combinations comprising at least one of the foregoing.

Embodiment 37

A vehicle component comprising the article of any of Embodiments 28-36.

Embodiment 38

A vehicle comprising: a structural body; and the vehicle component of Embodiment 37.

The invention may alternately include, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A method for manufacturing a hollow overmolded polymeric article comprising:
    positioning a hollow polymeric structure in a mold of a molding apparatus, wherein the hollow polymeric structure has an interior surface and an outer surface;
    supporting the interior surface;
    disposing a fibrous polymeric material into the mold proximal to the outer surface;
    overmolding the fibrous polymeric material onto to the outer surface;
    opening the mold; and
    removing a hollow overmolded polymeric article comprising the fibrous polymeric material overmolded on the hollow polymeric structure;
    wherein the hollow overmolded polymeric article is a structural reinforcement used in a vehicle component selected from a lift gate, door module, front end module, instrument panel carrier, and bumper cladding of a vehicle structure; and
    wherein supporting the interior surface of the hollow polymeric structure comprises
        plugging an end of the hollow polymeric structure and applying pressurized fluid to a hollow space within the hollow polymeric structure with a liquid pressurization device;
        plugging an end of the hollow polymeric structure and applying pressurized gas to hollow space within the hollow polymeric structure;
        inserting a slider into the hollow polymeric structure, wherein the slider contacts the inner surface of the hollow polymeric structure; or inserting a metal insert into the hollow polymeric structure, wherein the metal insert contacts the inner surface of the hollow polymeric structure.

2. The method of claim 1, wherein supporting the interior surface of hollow polymeric structure comprises plugging the ends of the hollow polymeric structure and applying pressurized fluid to the hollow space within the hollow polymeric structure with a liquid pressurization device.

3. The method of claim 1, wherein supporting the interior surface of hollow polymeric structure comprises plugging the ends of the hollow polymeric structure and applying pressurized gas to hollow space within the hollow polymeric structure.

4. The method of claim 1, wherein supporting the interior surface of hollow polymeric structure comprises inserting a slider into the hollow polymeric structure, wherein the slider contacts the inner surface of the hollow polymeric structure.

5. The method of claim 1, wherein supporting the interior surface of hollow polymeric structure comprises inserting a metal insert into the hollow polymeric structure, wherein the metal insert contacts the inner surface of the hollow polymeric structure.

6. A method for producing an overmolded polymeric article comprising:
positioning a prefabricated hollow polymeric component in a mold, wherein the hollow polymeric component is open at two end portions;
plugging the two end portions, wherein one plug is coupled to a pressurization device;
applying an internal pressure to the hollow polymeric component; and
overmolding the hollow polymeric component with a fibrous polymeric material.

7. The method of claim 6, wherein the pressurization device comprises a gas pressurization device.

8. The method of claim 6, wherein the pressurization device comprises a liquid pressurization device.

9. The method of claim 1, wherein introducing a fibrous polymeric material comprises injecting the fibrous polymeric material into the mold.

10. The method of claim 1, wherein the hollow polymeric structure has a wall thickness of less than or equal to 0.5 mm.

11. The method of claim 1, wherein at least one of the fibrous polymeric material and the hollow polymeric structure, comprises: polybutylene terephthalate; acrylonitrile-butadiene-styrene; polycarbonate; polycarbonate/polybutylene terephthalate blends; polycarbonate/acrylonitrile-butadiene-styrene blends; copolycarbonate-polyesters; acrylic-styrene-acrylonitrile; acrylonitrile-(ethylene-polypropylene diamine modified)-styrene; phenylene ether resins; blends of polyphenylene ether/polyamide blends of polycarbonate/polyethylene terephthalate/polybutylene terephthalate; polybutylene terephthalate and impact; polyamides; phenylene sulfide resins; polyvinyl chloride; high impact polystyrene; low/high density polyethylene; polypropylene; expanded polypropylene; and thermoplastic olefins, and combinations comprising at least one of the foregoing.

12. The method of claim 1, wherein the fibrous polymeric material comprises fibers comprising aramid, carbon, basalt, glass, plastic, metal, quartz, boron, cellulose, liquid crystal polymer, thermoplastic polymer, thermoset polymer, natural fibers, and combinations comprising at least one of the foregoing; preferably polypropylene, polyethylene, poly (hexano-6-lactam), poly[imino(1,6-dioxohexamethylene) imnohexamethylene], and combinations comprising at least one of the foregoing, and more preferably poly[imino(1,6-dioxohexamethylene) imnohexamethylene].

13. The method of claim 1, wherein the fibrous polymeric material comprises long glass fiber filled polypropylene.

14. The method of claim 1, wherein the cross section of the hollow polymeric structure comprises a closed section geometry.

15. The method of claim 1, wherein the wall thickness of the fiber fibrous polymer forms a wall that varies by less than 2% in thickness at any point in the hollow overmolded polymeric article.

16. The method of claim 1, wherein a wall thickness of the fiber reinforced polymeric material in the hollow overmolded polymeric article is at least 150% of a wall thickness of the hollow polymeric structure.

17. An article produced by the method of claim 1, wherein the article is a vehicle component.

18. A hollow overmolded polymeric article comprising:
a fibrous polymeric material overmolded onto a hollow polymeric structure;
wherein the hollow polymeric structure comprises a wall thickness of less than or equal to 0.5 mm.

19. The article of claim 18, wherein the density of the fibrous polymer and the material of the hollow polymeric structure is less than or equal to 1.5 g/cm$^3$.

20. A vehicle comprising:
a structural body; and
the article of claim 18.

* * * * *